United States Patent
Moylan et al.

(10) Patent No.: US 7,180,627 B2
(45) Date of Patent: Feb. 20, 2007

(54) HAND-HELD PORTABLE PRINTER WITH RFID READ/WRITE CAPABILITY

(75) Inventors: Peter Francis Moylan, Hoddesdon (GB); Donald A. Morrison, Bellbrook, OH (US)

(73) Assignee: Paxar Corporation, White Plains, NY (US)

(*) Notice: Subject to any disclaimer, the term of this patent is extended or adjusted under 35 U.S.C. 154(b) by 836 days.

(21) Appl. No.: 10/222,692

(22) Filed: Aug. 16, 2002

(65) Prior Publication Data
US 2004/0032443 A1    Feb. 19, 2004

(51) Int. Cl.
G06K 7/10    (2006.01)
G06K 9/22    (2006.01)
G06K 15/02   (2006.01)

(52) U.S. Cl. .................. 358/1.6; 340/10.51; 340/10.6; 235/462.45; 235/462.46; 235/462.48

(58) Field of Classification Search ............... 358/1.15, 358/473, 1.6; 235/383, 472.01, 462.45, 462.46, 235/462.48, 472.02, 385; 400/88; 340/572.8, 340/572.1, 572.2, 10.1, 10.3, 10.4, 10.51, 340/10.6; 382/313; 347/109
See application file for complete search history.

(56) References Cited

U.S. PATENT DOCUMENTS

| | | | |
|---|---|---|---|
| 5,483,624 A | 1/1996 | Christopher et al. | 358/1.18 |
| 5,486,259 A | 1/1996 | Goodwin et al. | |
| 5,594,838 A | 1/1997 | Christopher et al. | |
| 5,793,032 A | 8/1998 | Bard et al. | |
| 5,804,807 A * | 9/1998 | Murrah et al. | 235/383 |
| 6,327,972 B2 | 12/2001 | Heredia et al. | 101/35 |
| 6,409,401 B1 | 6/2002 | Petteruti et al. | |
| 6,467,688 B1 * | 10/2002 | Goldman et al. | 235/472.01 |
| 6,484,933 B1 * | 11/2002 | Zimmerman et al. | 235/375 |
| 6,652,170 B1 | 11/2003 | Arnold | |
| 6,761,316 B2 | 7/2004 | Bridgelall et al. | |
| 6,775,034 B1 * | 8/2004 | Morford | 358/473 |
| 6,830,181 B1 | 12/2004 | Bennett | |

(Continued)

FOREIGN PATENT DOCUMENTS

DE    198 46 295 A1    4/1999

(Continued)

OTHER PUBLICATIONS

U.S. Appl. No. 60/338,870, filed Dec. 2001, Petteruti et al.

(Continued)

Primary Examiner—Scott A. Rogers
(74) Attorney, Agent, or Firm—Joseph J. Grass

(57) ABSTRACT

A portable printer includes a number of input devices mounted in the printer housing including a barcode scanner, keypad, communication interface in a receive mode and an RFID read/write module in a read mode. The portable printer also includes a number of output devices including a printing system, the communication interface in a transmit mode and the RFID read/write module in a write mode for writing to an external RFID chip. A processor selects received data from one or more of the input devices, manipulates the data and/or combines it with other data for an output device wherein the data selected for one output device may be different then the data selected for another output device.

31 Claims, 2 Drawing Sheets

U.S. PATENT DOCUMENTS

| | | |
|---|---|---|
| 6,916,128 B1 | 7/2005 | Petteruti et al. |
| 6,991,159 B2 * | 1/2006 | Zenou ........................ 235/383 |
| 2001/0045452 A1 | 11/2001 | Momose et al. |

FOREIGN PATENT DOCUMENTS

| | | |
|---|---|---|
| EP | 0571 734 A | 12/1993 |
| EP | 0 996 084 A2 | 4/2000 |

OTHER PUBLICATIONS

European Search Report dated Jun. 30, 2005 for EP03 01 6660.7.

* cited by examiner

HAND-HELD PORTABLE PRINTER WITH RFID READ/WRITE CAPABILITY

CROSS-REFERENCE TO RELATED APPLICATION

A related application is Ser. No. 11/383,363 filed May 15, 2006.

FIELD OF THE INVENTION

The present invention is directed to a portable printer with RFID read/write capabilities and more particularly to such a portable printer capable of receiving data via a plurality of input devices mounted in the portable housing and capable of printing selected data, writing selected data to an external RFID chip and/or uploading selected data to a host.

BACKGROUND OF THE INVENTION

RFID (Radio Frequency Identification) chips have been embedded in tags, labels and the like to track inventory. The data contained in the chip is typically read by a stationary RFID read module as the inventory with the RFID chip is carried past the stationary read module on a conveyor belt or the like. Similarly, stationary RFID write modules are typically used to write data into the RFID chip.

U.S. Pat. No. 6,327,927 shows a stationary printer with an integrated transponder for writing data into a transponder chip embedded in a label and for printing data on the same label. The printer is connected to a computer via a conductor to received the data to be printed on the label together with data to be written into the chip in the label. In another embodiment, a serial number encoded into the RFID chip in the label is read by the transponder so that the serial number can be printed on the same label. Because this printer is a stationary unit, hardwired to a computer, its use is very limited. It can only print data received from the computer or read from the chip embedded in the label itself. Moreover, this printer is limited to reading from and writing to RFID chips that pass through the printer housing as opposed to RFID chips that are external to the printer.

Although portable barcode printers with an integrated barcode scanner and capable of communication with a host by a radio frequency transceiver are known, such as shown in U.S. Pat. No. 5,483,624. These printers are not capable of reading data from or writing data to a RFID chip.

BRIEF SUMMARY OF THE INVENTION

In accordance with the present invention, the disadvantages of prior printers as discussed above have been overcome. The printer of the present invention is portable, capable of receiving data via a plurality of input devices mounted in the portable printer and capable of printing selected data on a label, tag or the like; writing selected data to an external RFID chip; and/or uploading selected data to a host.

More particularly, the portable printer of the present invention includes a portable housing and a plurality of input devices mounted in the housing for receiving inputs to the printer. The input devices include a communication interface for receiving data; a plurality of keys actuable by a user and a RFID read/write module in a read mode operable to read data from an external RFID chip. A plurality of data output devices are also mounted in the portable housing. The output devices include a printing system having a printhead and a drive mechanism to drive a web of record members past the printhead for printing data on a record member. The communication interface in a transmit mode and the RFID read/write module in a write mode for writing data to an external RFID chip are also output devices mounted in the portable housing. A processor is mounted in the housing and operable to select data from one or more of the plurality of input devices for printing and coupling the selected print data to the printing system. The processor is also operable to select data from one or more of the plurality of output devices for writing and coupling the selected write data to the RFID read/write module for writing to an external RFID chip.

In accordance with a preferred embodiment of the present invention, the communication interface of the portable printer includes a radio transceiver and/or one or more communication ports. Further, the portable printer may include a barcode scanner as another input device. The barcode scanner may be mounted in the portable housing or coupled to the portable printer via the communication interface.

The portable printer of the present invention is extremely flexible and allows a user to easily accomplish barcode and RFID tracking, data collection, printing and RFID writing with one portable device. Moreover, the portable printer of the present invention allows a user to carry out new tracking functions that have heretofore not been possible as discussed in detail below.

These and other advantages and novel features of the present invention, as well as details of an illustrated embodiment thereof, will be more fully understood from the following description and drawings.

DETAILED DESCRIPTION OF THE INVENTION

Figure 1:
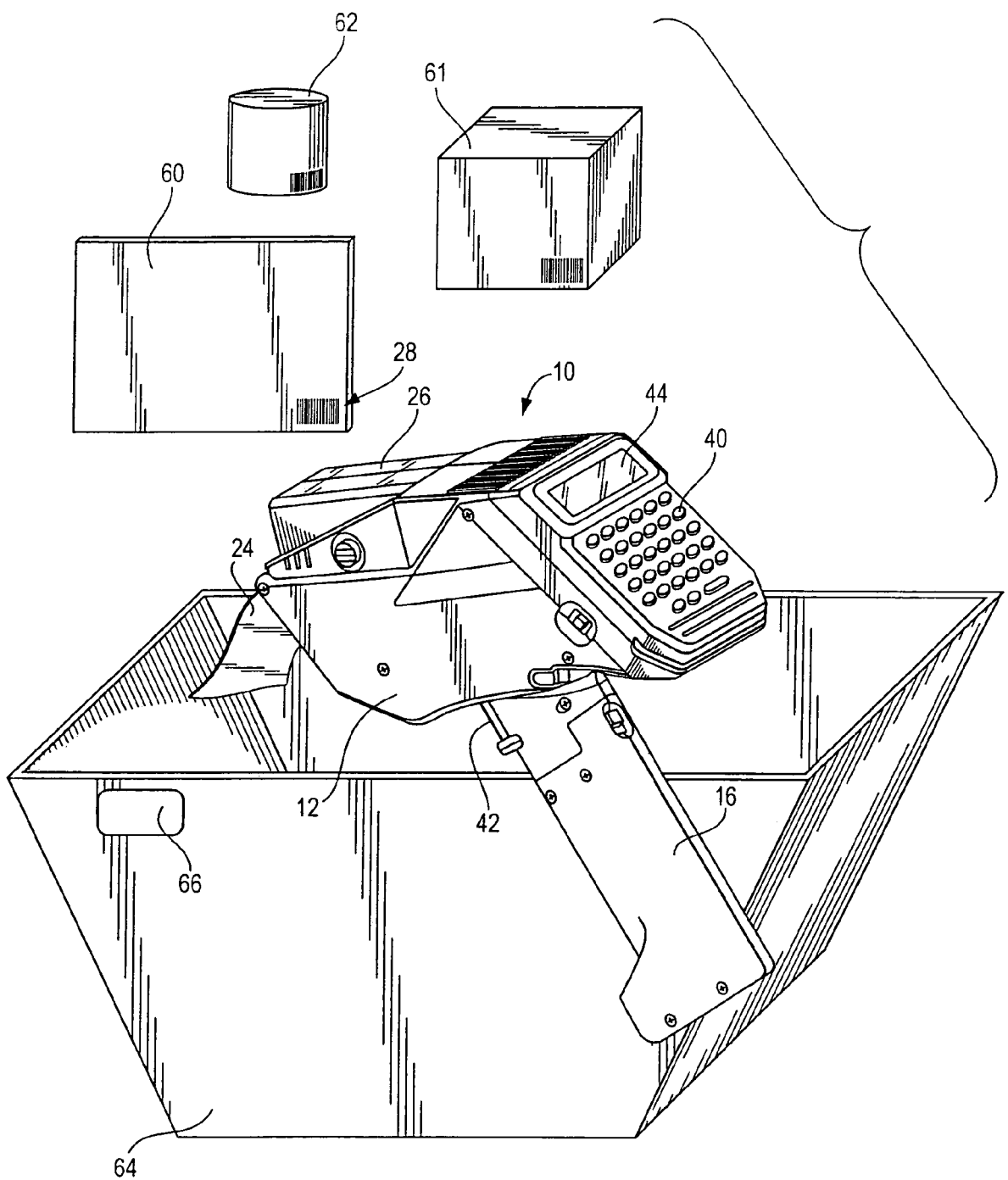
FIG. 1 is a perspective view of the portable printer of the present invention utilized to track items to be carried in a container having a RFID chip mounted thereon.
Figure 2:
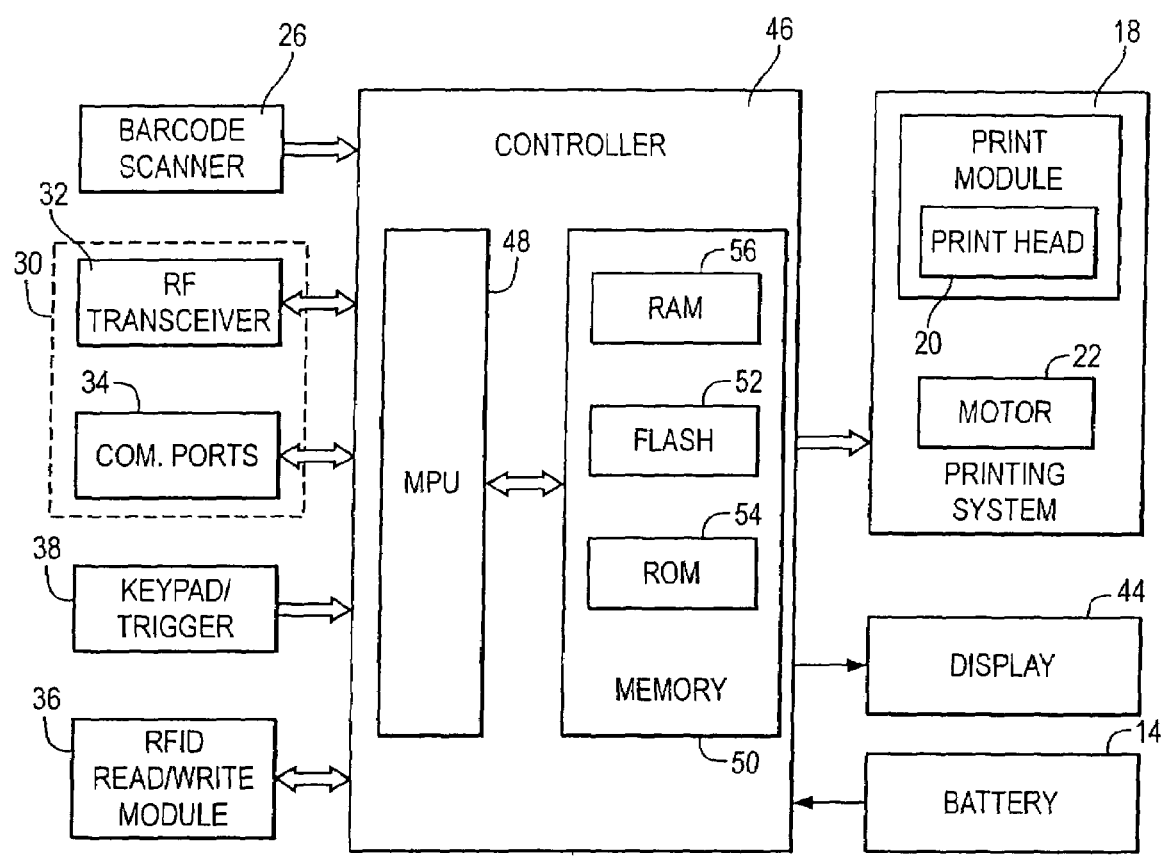
FIG. 2 is a block diagram of the portable printer of FIG. 1.

The portable printer 10 of the present invention as shown in FIGS. 1 and 2 includes a portable housing 12. A battery 14 is mounted in a handle 16 of the housing 12 to provide power to the portable printer 10. The portable printer 10 includes a printing system 18 with a printhead such as a thermal printhead 20 or the like. The printing system 18 also includes a motor 22 that drives a web of record members 24, such as labels, tags, etc. via one or more rollers (not shown) past the printhead 20 in order to print data thereon. The data printed by the printhead 20 includes a barcode and/or alpha-numeric information.

The portable printer 10 includes a number of input devices mounted in the housing 12. One such input device is a barcode scanner 26 that is actuable to scan a barcode 28 to provide scanned barcode data to the printer 10. The input devices also include a communication interface 30. In a preferred embodiment, the communication interface 30 includes a radio frequency transceiver 32 and/or one or more communication ports 34 such as a RS 232 port, a serial port, a parallel port, etc. The communication interface 30 allows the portable printer 10 to communicate with a host device to receive data therefrom or to transmit transaction data thereto. The communication interface 30 allows the portable printer 10 to communicate with the host in real time. Alternatively, the portable printer 10 may be operated off-line such that the data received from a host is stored in a look-up table or the like in a memory of the printer for later use. Similarly, data can be entered via one or more of the input devices, stored in a memory of the printer and later transmitted with a batch of data records to a host via a communication port 34. In another embodiment of the printer 10, the barcode scanner 26 is not mounted in the housing 12 but is coupled thereto via the communication interface 30 via either RF communications or via a cable coupled to a communication port 34.

A RFID read/write module 36 is mounted in the housing 12 of the portable printer 10. Although the RFID read/write module 36 is capable of reading and/or writing to a RFID chip embedded in a record member that is driven by the motor 22 internal to the housing 12, in a preferred embodiment, the RFID read/write module 36 reads data and/or writes data to an RFID chip that is external to the portable printer 10 as will be apparent from the applications discussed below. When operating in the read mode, the RFID read/write module forms one of the data input devices for the portable printer 10. In a write mode, the RFID read/write module 36 forms one of the output devices along with the printing system 18 and the communication interface 30 when transmitting or sending data out from the printer 10

In a preferred embodiment, the portable printer 10 includes a plurality of keys 38 including a keypad 40 and a trigger key 42. The keypad 40 may be utilized to enter alpha-numeric data to the portable printer 10. Alternatively, the keypad 40 may have only a limited number of keys that are actuable in accordance with information depicted on a display 44 for selecting a number of operations of the printer, for example, feeding a web of record members through the printer 10, displaying status information, etc. The trigger key 42 may be actuable by a user in various modes of the portable printer 10 to actuate the barcode scanner 26, the printing system 18 and/or the RFID read/write module 36. Alternatively, one or more of these devices can be actuated automatically by a controller 46 of the barcode printer 10 in accordance with a stored application program. In addition to displaying status information or data entered via the keyboard, the display 44 may also be controlled to provide prompts to the user to actuate the trigger key and/or other keys so as to control various operations of the portable printer 10.

The portable printer 10 includes a microprocessor 48 and a memory 50. The memory 50 includes non-volatile memory such as flash memory 52 and/or a ROM 54 such as the EEPROM. The memory 50 also includes a RAM 56 for storing and manipulating data. In accordance with a preferred embodiment of the present invention, the microprocessor 48 controls the operations of the portable printer 10 in accordance with an application program that is stored in the flash memory 52. The microprocessor 48 may operate directly in accordance with the application program. Alternatively, the microprocessor 48 can operate indirectly in accordance with the application program as interpreted by an interpreter program stored in the memory 54 or another area of the flash memory 52.

The microprocessor 48 is operable to select an input device 28, 32, 34, 38 and 36 to receive data therefrom and to manipulate the receive data and/or combine it with data received from a different input source 26, 32, 34, 38 or 36 in accordance with a stored application program. The microprocessor couples the selected, combined and/or manipulated data to the printing system 18 for printing on a record member. The microprocessor may select the same or different data to be written to an external RFID chip. The microprocessor couples the data selected for writing to the RFID read/write module 36 wherein the data is written in encoded form to the external RFID chip. Similarly, the microprocessor 48 can select the same or different data for storage in a transaction record in the RAM 56 and for uploading via the communication interface 30 to a host. The processor 48 is operable to select data to be coupled to the printing system 18 independently of the data that the processor 48 selects to be coupled to the RFID read/write module 36 to provide greater flexibility than has heretofore been possible.

The portable printer 10 of the present invention can be used for a number of applications. For example, the portable printer 10 may used to track items 60, 61, 62, etc. that are packed or carried in a container 64 having a RFID chip 66 mounted thereon. In accordance with this application, the portable printer 10 may be operated by the microprocessor 48 to first display a message on the display 44 prompting the user to enter a product code. In response to this displayed message the user would actuate the trigger to operate the barcode scanner 26 to scan a barcode 28 on an item 60 to be placed into the container 64. Alternatively, the user could enter the product code via the keypad 40. Once the scanned or keyed in product code information is received by the portable printer 10, the microprocessor 48 sends a message via the RF transceiver 32 to a host computer or the like to obtain other data associated with the product code that was scanned or keyed in. The information received from the host via the radio transceiver 32 may include, for example, price, supplier code, date information etc. Upon receiving the additional product information from the host, the microprocessor 48 controls the RFID read/write module 36 to read data encoded in the RFID chip 66 mounted on the container 64. The information included in the RFID chip may be a container ID for example. Upon receiving the information read from the RFID chip 66, the microprocessor 48 assembles a transaction record that includes the container ID read from the RFID chip 66, the product ID scanned by the barcode scanner 26 or keyed via the keypad 40 along with the price and other product information received from the host. The transaction record is stored in the RAM 56. The microprocessor 48 selects data, for example the scanned or keyed in product ID, along with the price and product description received from the host via the RF transceiver 32 for printing and couples the selected data to the printing system 18 to print the data on a label 24. The label then may be affixed to the item 60. Next, the microprocessor 48 selects received data, for example the product code of item 60, to be written to the external RFID chip 66. The microprocessor 48 couples the selected data to the RFID read/write module 36 to write selected data to the RFID chip 66. The barcode printer 10 can similarly process each of the additional items put into the container 64 such as the item 61 and the item 62. As the items are processed by the portable printer 10, labels are printed for each of the items and the RFID chip 66 is updated to add the product code for each item 61, 62. The portable printer 10 can upload an individual transaction record to the host via the RF transceiver 32 as each item is processed by the printer 10. Alternatively, the printer 10 can store a number of transaction records each associated with an individual product and at a later time upload to the host all of the transaction records in association with the container 64 identification read from the chip 66 via the transceiver 32 or communication port 34. Similarly, the printer 10 can print a packing label for the container 64 listing all of the items contained therein and the associated information. Because the data printed on the label 24, the data written to the RFID chip 66 and the data uploaded to the host computer are used for different purposes, the printer 10 can select different data from the different data input devices to be coupled to the respective printing system RFID read/write module and communication interface 30 as is desired.

In another application, the portable printer 10 can be used by a retail clerk to process the sale of clothes or other items. In this application, when an item is sold, the portable printer 10 is operated such that the microprocessor 48 controls the scanner 26 to scan a barcode on a tag affixed to the clothing. Upon receipt of the scanned barcode, the microprocessor 48 retrieves from a host computer via the communication interface 30 or from a user via the keys 40, a markdown price, for example. In response to the receipt of the markdown price, the microprocessor 48 couples the price data to the printing system 18 to print a markdown price label which is affixed to the tag. The printer 10 then selects and couples the current date of the sale and the markdown price to the RFID read/write module 36 to cause the module 36 to write the data to an RFID chip contained in a woven label that is sewn to the clothing. The microprocessor 48 also stores a record of the transaction for uploading to the host computer. Later if the clothing is returned, the RFID chip embedded in the woven label tag can be read by the portable printer 10 to determine the date of the sale, the price, etc. The portable printer 10 then couples a code indicating that this is a returned item to the RFID read/write module 36 to write the code to the RFID tag affixed to the clothing. In this manner, returned clothing may be tracked for inventory and/or additional price markdowns if desired.

A further application can prevent theft from a retailer where an individual tries to return to a store an item that was never purchased. In this application, the portable printer 10 is used at a checkout station to scan a barcode on a tag or label carried on an item that is being purchased. The item identification from the scanned barcode is sent by the microprocessor 48 via a communication port to a host. Once the item is paid for, the printer 10 receives a transaction complete message from the host. Upon receipt of the transaction complete message, the microprocessor 48 controls the read/write module to write a code to an RFID chip carried on the product designating that the product was purchased and/or the date of the sale. If an item is returned for cash, the printer 10 can read the RFID tag to determine if the item was actually purchased, i.e. paid for. Moreover, a stationary RFID reader can be placed near the exit to a store to read the RFID tag on items as they pass by. If a RFID chip is read without the code indicating that the item was paid for, an alarm can sound.

Because the printer 10 can be operated in an off-line or stand alone mode, if the host or communication network goes down, the printer 10 can read information from an RFID tag via the RFID read/write module 36. The read data can be displayed by the microprocessor 48 on the display 44 and/or printed. The read data can then be used by the microprocessor to lookup information associated with the read data that is stored in the RAM 56 which may be a battery-backed RAM or in the flash memory 56. The read data and stored data can then be combined by the microprocessor 48 for printing by the printing system 18.

These are just a few examples illustrating the flexibility of the portable printer 10 of the present invention. Many more are possible. Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A hand-held portable printer comprising:
    a hand-held portable housing;
    a radio transceiver on the housing for receiving and transmitting data;
    a barcode scanner on the housing to provide scanned barcode data;
    a printing system on the housing, the printing system including a printhead and a motor to drive a web of record members past the printhead to print data on RFID chips on record members internal to the housing;
    an RFID reader/writer on the housing, the RFID reader/writer in accordance with a read operation providing data read from an RFID chip external to the housing and the RFID reader/writer in accordance with a write operation to write data to an external RFID chip;
    a keypad on the housing to provide user inputs;
    a memory to store an application program;
    a processor operable in accordance with the application program to take data input from at least one of the radio transceiver, the keypad, the barcode scanner and the RFID reader/writer and to selectively couple data to at least one of the printing system to print on a record member, the RFID reader/writer to write to an external RFID clip, the RFID reader/writer to write to an internal RFID chip and the radio transceiver to transmit data.

2. A hand-held portable printer as recited in claim 1 including a display mounted on the hand-held portable housing.

3. A hand-held portable printer as recited in claim 2 wherein the processor controls the display to prompt a user to actuate the keypad to initiate an operation.

4. A hand-held portable printer as recited in claim 1 wherein the keypad is operable by a user to provide an input to initiate an operation.

5. A hand-held portable printer as recited in claim 1 wherein the processor controls the transceiver to provide real time communications with a host.

6. A hand-held portable printer as recited in claim 1 including at least one communication port for receiving a cable to couple the portable printer to a peripheral device to receive data therefrom and/or to send data thereto.

7. A hand-held portable printer comprising:
    a hand-held portable housing;
    a plurality of input devices on the housing for receiving inputs including a communication interface for receiving data; a keypad actuatable by a user; and an RFID reader/writer in a read mode to read data from an RFID chip external to the housing;
    a plurality of data output devices on the housing including a printing system having a printhead and a motor to drive a web of record members past the printhead to print data on the record members containing RFID chips disposed internal to the housing, the communication interface for transmitting data and the RFID reader/writer in a write mode to write data to an RFID chip external to the housing; and
    a processor on the housing and operable to select data from at least one of the plurality of input devices to print and coupling the selected print data to the printing system, and the processor operable to select data from at least one of the plurality of input devices to write and selectively coupling the selected write data to the RFID reader/writer to write to an external RFID chip or to an internal RFID chip.

8. A hand-held portable printer as recited in claim 7 wherein the communication interface includes a radio transceiver.

9. A hand-held portable printer as recited in claim 7 wherein the communication interface includes a communication port.

10. A hand-held portable printer as recited in claim 9 wherein the communication port includes a serial port.

11. A hand-held portable printer as recited in claim 9 wherein the communication port includes a parallel port.

12. A hand-held portable printer as recited in claim 9 wherein the communication port includes an RS232 port.

13. A hand-held portable printer as recited in claim 7 wherein the communication interface includes a radio transceiver and a communication port.

14. A hand-held portable printer as recited in claim 7 wherein the key pad is actuatable by a user to enter data to be printed or written.

15. A hand-held portable printer as recited in claim 7 wherein the keypad is actuatable by a user to select a plurality of operations.

16. A hand-held portable printer as recited in claim 7 wherein the keypad is actuatable by a user to initiate an operation.

17. A hand-held portable printer as recited in claim 7 including a memory for storing an application program according to which the processor operates, the application program determining the data selected for printing and the data selected for reading or writing by the RFID reader/writer.

18. A hand-held portable printer as recited in claim 7 including a memory for storing information representing at least one of the data received, printed and written in association with a transaction in a transaction record.

19. A hand-held portable printer as recited in claim 18 wherein said memory stores a plurality of transaction records.

20. A hand-held portable printer comprising:
a hand-held portable housing;
a plurality of input devices on the housing including an RFID reader/writer in a read mode to read an RFID chip external to the housing;
a plurality of output devices on the housing including the reader/writer in a write mode, a display and a printhead to print record members containing RFID chips disposed internal to the housing and to write to the internal RFID chips;
a memory to store an application program; and
a processor to process input data in accordance with the application program, the processor selectively coupling processed data to one or more of the output devices.

21. A hand-held portable printer as recited in claim 20 wherein said processing includes combining data read via the RFID reader/writer with stored data for printing.

22. A hand-held portable printer as recited in claim 20 wherein said processing includes converting data read via the RFID reader/writer to human readable information for display and/or printing.

23. A hand-held portable data tracking and printing device comprising:
a hand-held portable housing with a handle;
a barcode scanner on the housing;
a communication interface on the housing to allow communications between the device and a host;
an RFID reader/writer on the housing to read from and write to selectively an RFID chip external to the housing or to an RFID chip on a record member internal to the housing;
a display on the housing;
a printhead to print on record members containing RFID chips internal to the housing;
a memory on the housing to store an application program; and
a processor on the housing for processing data received by at least one of the barcode scanner, the communication interface and the RFID reader/writer and providing output data selectively to at least one of the communication interface, the RFID reader/writer and the display in accordance with the stored application program.

24. A hand-held portable data tracking and printing device as recited in claim 23 including a motor for driving a web of record members past the printhead, the processor providing output data to the printing system to print.

25. A hand-held portable data tracking and printing device as recited in claim 23 including a keypad to which the processor is responsive.

26. A hand-held portable printer comprising:
a hand-held portable housing having a handle;
a radio transceiver on the housing for receiving and transmitting data;
a barcode scanner on the housing for providing scanned barcode data;
a printing system on the housing, the printing system including a printhead and a motor to drive a web of record members past the printhead to print data on RFID chips on record members internal to the housing;
an RFID reader/writer on the housing, the RFID reader/writer in accordance with a read operation providing data read from an RFID chip external to the housing and the RFID reader/writer in accordance with a write operation providing data to write to an external RFID chip;
a keypad on the housing to provide user inputs;
a trigger disposed at the handle to cause actuation of any one or more of the bar code scanner, the printing system and the RFID reader/writer;
a memory to store an application program; and
a processor operable in accordance with the application program to take data input from at least one of the radio transceiver, the keypad, the barcode scanner and the RFID reader/writer and to selectively couple data to at least one of the printing system to print on a record member, the RFID reader/writer to write to an external RFID chip the RFID reader/writer to write to an internal RFID chip, and to the radio transceiver to transmit the data.

27. A hand-held portable printer comprising:
a hand-held portable housing having a handle; a plurality of input devices on the housing for receiving inputs including a communication interface for receiving data; a keypad actuatable by a user; and an RFID reader/writer in a read mode for reading data from an RFID chip external to the housing;
a plurality of data output devices on the housing including a printing system having a printhead and a motor to drive a web of record members past the printhead to print data on the record members containing RFID chips disposed internal to the housing, the communication interface for transmitting data and the RFID reader/writer in a write mode to write data to an RFID chip external to the housing;

a trigger disposed at the handle to cause actuation of either one or both of the printing system and the RFID reader/writer; and a processor on the housing and operable to select data from at least one of the plurality of input devices to print and coupling the selected print data to the printing system, and the processor operable to select data from at least one of the plurality of input devices to write and coupling the selected write data to the RFID reader/writer to write to an external RFID chip.

28. A hand-held portable printer comprising:

a hand-held portable housing having a handle;

a plurality of input devices on the housing including an RFID reader/writer in a read mode to read an RFID chip external to the housing;

a plurality of output devices on the housing including the reader/writer in a write mode, a display and a printhead to print record members containing RFID chips disposed internal to the housing and to write to internal RFID chips;

a trigger disposed at the handle to cause actuation of at least one of the printhead and the RFID reader/writer;

a memory to store an application program; and a processor to process input data in accordance with the application program, the processor selectively coupling processed data to at least one of the output devices.

29. A hand-held portable data tracking and printing device comprising:

a hand-held portable housing having a handle;

a barcode scanner on the housing;

a communication interface on the housing to allow communications between the device and a host;

an RFID reader/writer on the housing selectively to read from and write to an RFID chip external to the housing or to an RFID chip on a record member internal to the housing;

a display on the housing;

a printhead to print on record members containing RFID chips internal to the housing;

a trigger disposed at the handle to cause actuation of at least one of the bar code scanner, the printhead and/or and the RFID reader/writer;

a memory on the housing to store an application program; and a processor on the housing to process data received by at least one of the barcode scanner, the communication interface and the RFID reader/writer and to provide output data selectively to at least one of to the communication interface, the RFID reader/writer and the display in accordance with the stored application program.

30. A hand-held portable printer comprising:

a hand-held portable housing, a radio transceiver on the housing for receiving and transmitting data;

a barcode scanner on the housing to provide scanned barcode data;

a printing system on the housing, the printing system including a printhead and a motor to drive a web of record members past the printhead to print data on RFID chips on record members internal to the housing;

an RFID reader/writer on the housing, the RFID reader/writer in accordance with a read operation providing data read from an RFID chip external to the housing and the RFID reader/writer in accordance with a write operation to write data to an external RFID chip;

a keypad on the housing to provide user inputs;

a memory to store an application program; and a processor operable in accordance with the application program to take data input from at least one of the radio transceivers, the keypad, the barcode scanner and the RFID reader/writer; the application program having computer-readable instructions to selectively couple:

data to the printing system to print;

the RFID reader/writer to write to an external RFID chip or to an internal RFID chip; and the radio transceiver to transmit data.

31. A system for printing and RFID encoding labels, comprising:

a hand-held portable printer including a hand-held housing, a print head to print on a web of RFID record members containing RFID chips internal to the housing, an RFID reader/writer on the housing selectively to read or write to an RFID chip external to the housing and to read or write to an internal RFID chip, and a host computer in communication with the hand-held portable printer, the host computer receiving data read from the external RFID chip, and the host computer having additional information relating to the received data to write selectively to an external RFID chip or to an internal RFID chip.

* * * * *